April 19, 1960

R. F. LAWRENCE 2,933,616

INDUCTIVE APPARATUS

Filed Oct. 8, 1958

INVENTOR
Robert F. Lawrence

United States Patent Office 2,933,616
Patented Apr. 19, 1960

2,933,616

INDUCTIVE APPARATUS

Robert F. Lawrence, Wilkinsburg, Pa., assignor to Westinghouse Electric Corporation, East Pittsburgh, Pa., a corporation of Pennsylvania Application October 8, 1958, Serial No. 765,991

7 Claims. (Cl. 307—83)

This invention relates to inductive apparatus in general and in particular to transformers used in distribution systems.

It is an object of this invention to provide improved inductive apparatus.

It is another object of this invention to provide improved inductive apparatus for distribution transformers which will permit an increase in the reliability of residential electric service at low cost, and at the same time, make it possible for maintenance and repair work to be done on a feeder line without loss of secondary service.

Further objects of this invention will become apparent from the following description when taken in conjunction with the accompanying drawings. In said drawings, for illustrative purposes only, are shown preferred embodiments of this invention.

Figure 1:
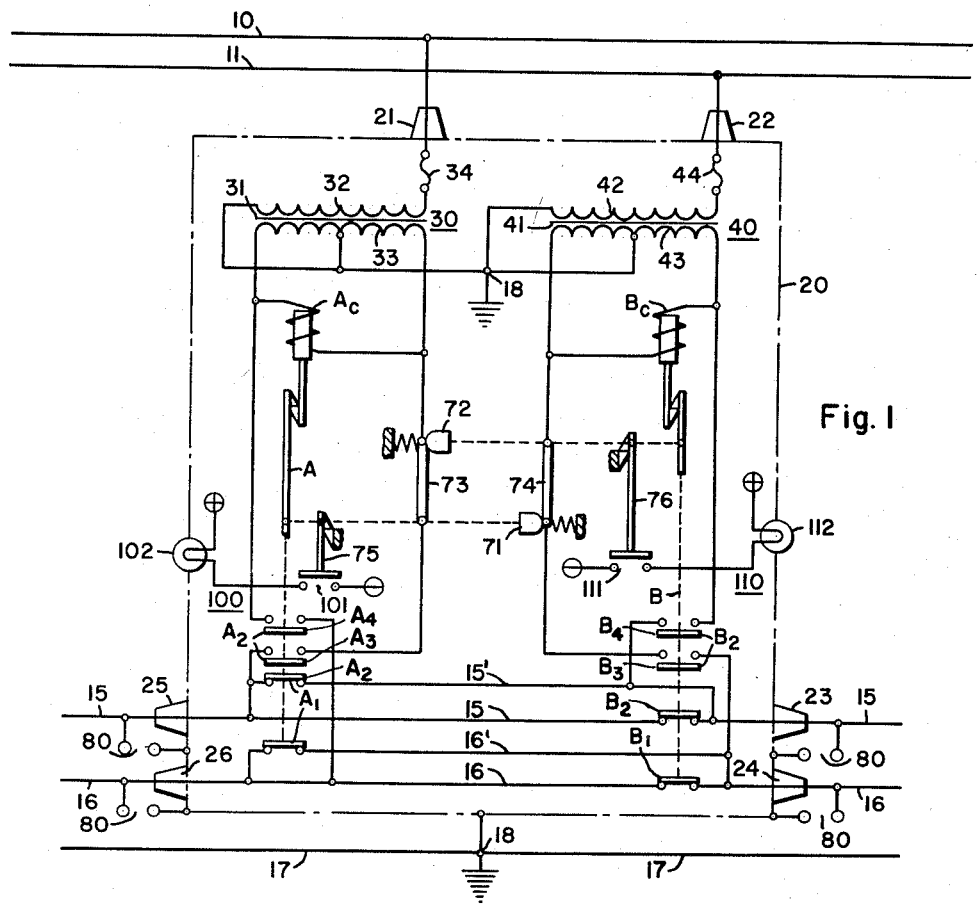
Figure 1 is a schematic diagram of distribution apparatus embodying the teachings of this invention.

Referring to Fig. 1, there is illustrated distribution inductive apparatus comprising, in general, a containing tank 20 having enclosed therein two separate transformers 30 and 40 and circuit breakers A and B.

The transformer 30 comprises a magnetic core 31 having inductively disposed thereon a primary winding 32 and a center-tap secondary winding 33. The transformer 40 comprises a magnetic core 41 having inductively disposed thereon a primary winding 42 and a center tap secondary winding 43.

The primary winding 32 of the transformer 30 is connected between a conductor 10 and a grounded connection 18 attached to the transformer tank 20. The grounded connection 18 is connected to a neutral or return conductor 17. The connection between the conductor 10 and the one lead of the primary winding 32 is made through a suitable insulating bushing 21 attached to the tank 20. A first contact or switching means $A_4$ of the circuit breaker A, the center tap secondary winding 33, a thermally responsive element 73 and a second contact or switching means $A_3$ of the circuit breaker A are connected in series circuit relationship between a pair of distribution conductors 15 and 16. The energizing coil $A_c$ of the circuit breaker A is connected across the winding 33. The center tap of the winding 33 is connected to ground.

The primary winding 42 of transformer 40 is connected between a conductor 11 and ground. The connection from the conductor 11 to the one lead of the winding 42 is made through an insulating bushing 22 connected to the tank 20. A first contact or switching means $B_4$ of the circuit breaker B, a thermally responsive element 74, the center tapped secondary winding 43, and a second contact or switching means $B_3$ of the circuit breaker B are connected in series circuit relationship between the conductors 15' and 16'. The energizing coil $B_c$ of the circuit breaker B is connected across the winding 43.

The center tap of the winding 43 is connected to ground. The conductors 15 and 16 are admitted to the tank 20 through a set of suitable insulating bushings 25 and 26, respectively. The conductors 15' and 16' are admitted to the tank 20 through a suitable pair of insulating bushings 23 and 24, respectively. A third contact $A_2$ of the breaker A and a third contact $B_2$ of the breaker B are connected in parallel circuit relationship between the conductors 15 and 15', between the bushings 23 and 25. A fourth contact $A_1$ and a fourth contact $B_1$ of the breakers A and B, respectively, are connected in parallel circuit relationship between the conductors 16 and 16' within the tank 20 between the bushings 24 and 26. From the foregoing it is seen that the conductors 15 and 16 may be connected in series circuit relationship with the conductors 15' and 16' by closing either of the sets of contacts $A_1$—$A_2$ or $B_1$—$B_2$.

In operation, the primary feeder to the distribution apparatus, shown in Fig. 1, consists of the two conductors 10 and 11 and the neutral 17. Each primary winding 32 and 42 is connected to a primary conductor 10 and 11, respectively, as shown. The secondary winding 33 energizes a coil $A_c$ of the breaker A associated with transformer 30. The secondary winding 43 energizes a coil $B_c$ of the breaker B associated with transformer 40. Contacts $A_1$—$A_2$ and $B_1$—$B_2$ are back contacts and are closed when the contacts $A_3$—$A_4$ and $B_3$—$B_4$ are opened, and vice versa. When the coils $A_c$ and $B_c$ are energized, the contacts $A_3$—$A_4$ and $B_3$—$B_4$ of the breakers A and B are closed. When the coils $A_c$ and $B_c$ are deenergized, contacts $A_1$—$A_2$ and $B_1$—$B_2$ of the breaker are open. Thus, if either of the primary conductors 10 or 11 is deenergized, the switching arrangement opens contacts $A_3$—$A_4$ or $B_3$—$B_4$, as the case may be, and closes $A_1$—$A_2$ or $B_1$—$B_2$, thusly, one of the transformers 30 or 40 picks up the secondary load that was dropped momentarily by the other transformer. The primary conductors 10 and 11 may be the same or different phases.

In distribution systems there are protective mechanisms, well known in the art, for temporarily removing power from the primary feeder lines when a fault occurs. The primary conductor associated with the fault would remain open and the good primary conductor would restore. Then the secondary contacts, $A_1$—$A_2$ or $B_1$—$B_2$, as the case may be, pick up to restore secondary service as described above.

The thermal elements 73 and 74 of each transformer provides two settings. One setting is the same for each of transformers 30 and 40 and would light a signal light for the particular transformer to which it is connected for "normal overload." This setting would be the one in existence when both breakers A and B and thus contacts $A_3$—$A_4$ and $B_3$—$B_4$ are closed. For only one breaker closed a mechanical linkage changes the setting of the thermal elements to provide for "emergency overload" protection on the remaining core and coils.

Referring again to Fig. 1, there is shown the thermal element 73 mechanically linked to a latching means 75. The latching means 75 is connected to contacts 101 which are connected in an alarm circuit 100. The alarm circuit 100 comprises an alarm means 102, which is shown as a lamp but may be a buzzer or other suitable alarm means, connected in series with an alarm supply voltage, not shown. The alarm supply voltage may be obtained from the distribution system itself or from independent means, such as solar batteries mounted on the tank 20. A similar alarm circuit 110 including alarm indicating means 112 is provided for the transformer 40. The bimetal 74 is mechanically linked to the latching means 76. The bimetals 73 and 74 in response to a "normal overload" will unlatch 75 and 76 allowing contacts 101 and 111 to close, energizing the alarm circuits 100 and 110, respectively.

The bimetals 73 and 74 are also mechanically linked to the breakers A and B and will unlatch the breakers A and B in response to an emergency overload.

Primary protection for the transformers 30 and 40 is provided by the fuses 34 and 44 connected in series with the primary windings 32 and 42, respectively. The purpose of protective links 34 and 44 is to free the primary circuit of a faulted core and coils. Surge protection on the low voltage side of the transformers 30 and 40 is provided by the secondary surge gaps 80 connected to the grounded tank 20 and the distribution lines 15 and 16.

Figure 2:
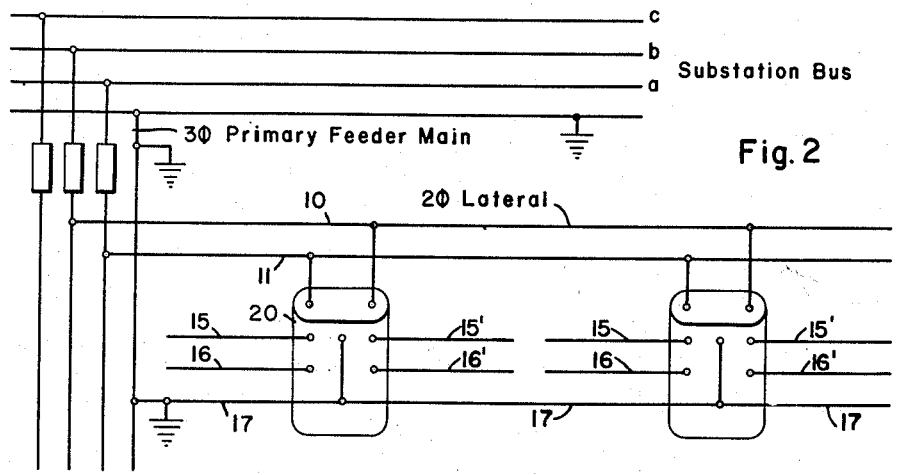
Fig. 2 is a schematic diagram illustrating how the apparatus of Fig. 1 may be connected into a system.

For the example of the connection of the apparatus as shown in Fig. 1, when connected in a system as shown in Fig. 2, assume that each half of the load of the secondary is a maximum 30 minute peak of 35 kva. A suggested continuous rating for each setting of the transformers 30 and 40 might be as low as 25 kva., which would, then, be overloaded to 70 kva., again a 30 minute peak, for emergency operation. While additional voltage drop would be obtained for the emergency condition, additional voltage drop can be tolerated during such condition of operation.

The "emergency overload" actually determines the "normal overload" because the system must be expected to operate satisfactorily with one primary out over a peak load period. The reason for the "normal overload" is to indicate by operation of a bimetal and a light that the loading on the two transformers 30 and 40 is such that under emergency conditions the system will have reached its limits. Since "normal" conditions persist the majority of the time, some indication under "normal" is required to insure that "emergency" conditions will be met.

The change in calibration of the bimetals 73 and 74 from "normal" loading to "emergency" loading may be accomplished by any suitable means, of which there are a number well known to those skilled in the art. In Fig. 1 this is accomplished by cams 71 and 72 which are mechanically linked to the bimetals 73 and 74, respectively. Thus when one of the transformers 30 or 40 is not energized the cam associated with its bimetal bears against and changes the calibration of the other bimetal. Therefore, the calibration or original position of the other bimetal is changed causing it to trip its associated circuit breaker and latching means sooner. A deenergized circuit of the apparatus shown in Fig. 1 may be repaired or worked on without losing secondary power furnished to the conductors 15 and 16.

Referring to Fig. 2, there is illustrated means for connecting a plurality of the apparatus illustrated in Fig. 1 into a system. A substation bus having a ground conductor and conductors *a*, *b* and *c* is provided. A three-phase primary feeder main is tapped from the substation bus. A two-phase lateral connection, which are the conductors 10 and 11 of both Figs. 1 and 2, is made from the three-phase primary feeder main. Thus, the conductors 15, 16, 15', 16' and 17 will provide an N/2N volt three wire secondary for distribution purposes.

Figure 3:
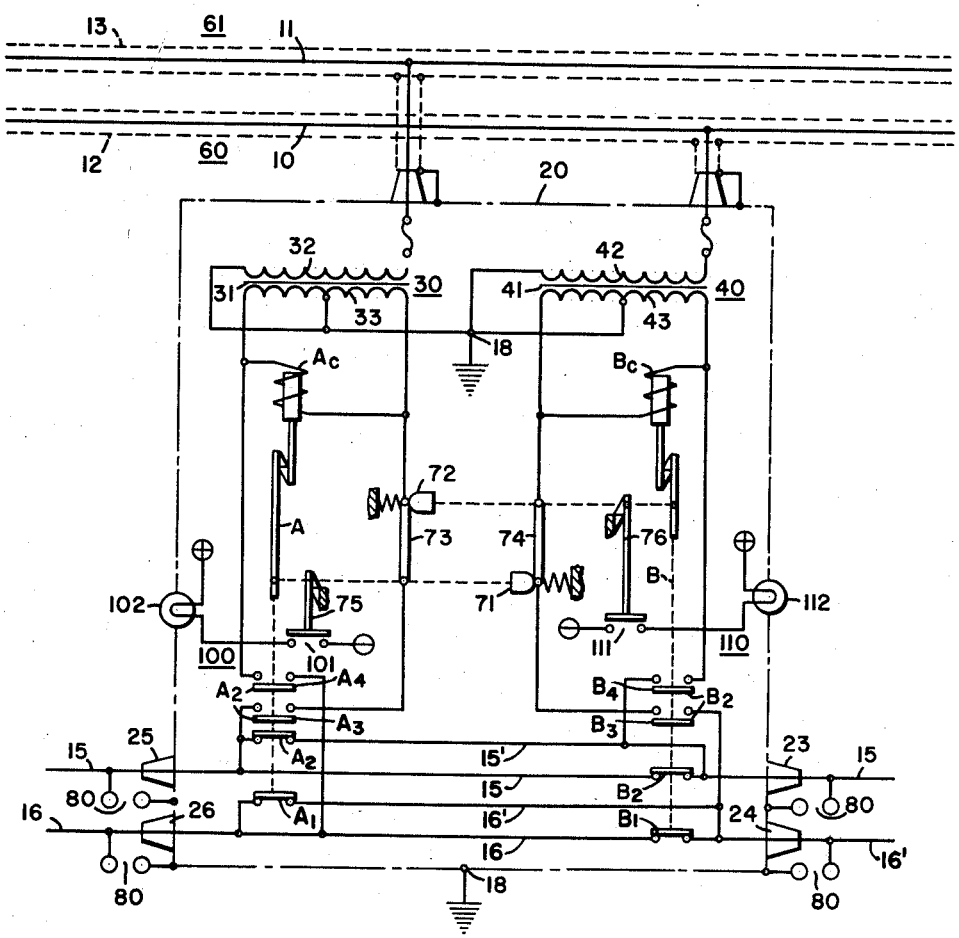
Fig. 3 is a schematic diagram of a second embodiment of the teachings of this invention.

Referring to Fig. 3, there is illustrated another embodiment of the teachings of this invention, in which like components of Figs. 1 and 3 have been given the same reference characters. The main distinction between the apparatus illustrated in Figs. 1 and 3 is that in Fig. 3 concentric conductors 60 and 61 have been provided which forms the primary circuit. The inner conductors 10 and 11 of the concentric conductors 60 and 61 are the same conductors 10 and 11 of Fig. 1. The outer shields 12 and 13 of the concentric conductors 60 and 61 form the common neutral for the primary and secondary portions of the apparatus of Fig. 3.

The provision of the concentric conductors 60 and 61 allows the system to be more usable overhead and underground. On overhead use, the concentric conductors 60 and 61 do not require the addition of lightning arresters to the transformers or the system since there is no lightning exposure of the energized conductors. Further, the low impulse level inherent in air insulated equipment would permit air insulation of core and coils instead of oil insulation and coolant, thereby adding a cost reduction. When utilizing concentric conductors, a deenergized circuit may also be worked upon without losing secondary power furnished to the conductors 15 and 16.

The apparatus of Fig. 3 may be further modified to enclose the transformer 30 in a first container, the transformer 40 in a second container and the circuit breakers A and B and their associated circuitry in a third container. In this modification, the contacts would be of low cost by virtue of making them open only against the dynamic voltage of the secondary system. They would therefore be disconnect switch contacts instead of circuit interruptors. Thus no primary protective link, such as 34 and 44, would be required as well as no secondary protection because each primary conductor, transformer and secondary would be treated as a unit from a protective standpoint. The individual transformer would be considered expendable with regard to secondary or transformer faults that would cause it to fault and result in operation of the primary protective equipment at the source. Secondary faults, as is known, usually burn clear. The apparatus in individual containers would operate the same as hereinbefore described, but would be adapted to easier replacement of the individual units.

In conclusion, it is pointed out that while the illustrated examples constitute practical embodiments of my invention, I do not limit myself to the exact details shown, since modification of the same may be varied without departing from the spirit of this invention.

I claim as my invention:

1. Inductive apparatus comprising, a plurality of cores mounted within an enclosure, each said core having a primary winding and a secondary winding associated therewith, a plurality of distribution conductors, first and second switching means for each said secondary winding, said second switching means being in open circuit position when said first switching means is in closed circuit position and said first switching means being in open circuit position when said second switching means is in closed circuit position, means for operating said switch means to open and closed circuit positions, said first switching means when in closed circuit position connecting one of said secondary windings to first of said distribution conductors, said first switching means when in open circuit position disconnecting said first one of said secondary windings from the first of said distribution conductors, said second switch means being operated to closed circuit position upon opening of said first switch means, said second switch means in closed circuit position connecting another one of said secondary windings to the first of said distribution conductors.

2. An inductive apparatus, comprising; a plurality of cores mounted within an enclosure; each said core having a primary winding and a secondary winding; a plurality of distribution conductors; first and second switching means for each said secondary winding; said first switching means when closed connecting said secondary windings to said distribution conductors; contacts of said second switching means for each of said secondary windings being connected in a parallel circuit; each of said parallel circuits being connected in series with first and second of said distribution conductors; said first switching means being an open circuit when said second switching means is a closed circuit.

3. An inductive apparatus, comprising; a plurality of cores mounted within enclosure means; each said core having a primary winding and a secondary winding; a plurality of distribution conductors; first and second switching means for each said secondary winding; said first switching means connecting said secondary winding to said distribution conductors; contacts of said second switching means for each of said secondary windings being connected in a parallel circuit; each of said parallel circuits being connected in series with a pair of said distribution conductors; said first switching means being an open circuit when said second switching means is a closed circuit; means connected across said secondary winding of each core which is operative to close said first switching means in response to the application of a predetermined voltage to said primary winding of said core.

4. An inductive apparatus, comprising; first and second cores mounted within enclosure means; each of said cores having primary and secondary windings; first and second breaker means associated respectively with said secondary windings; each said breaker means having forward and back contacts; circuit means including said forward contacts of said associated breaker means for connecting said secondary windings to a plurality of distribution conductors; back contacts of each of said first and second breaker means being connected in a parallel circuit, each of said parallel circuits being connected in series with a pair of said distribution conductors.

5. An inductive apparatus, comprising; first and second cores mounted within enclosure means; each of said cores having primary and secondary windings; first and second breaker means associated respectively with each of said secondary windings; each said breaker means having forward and back contacts; circuit means including said forward contacts of said associated breaker means for connecting said secondary windings to a plurality of distribution conductors; said back contacts of said first and second breaker means being connected in a parallel circuit, each of said parallel circuits being connected in series with a pair of said distribution conductors; said forward contacts of each said breaker means being open when said back contacts are closed.

6. An inductive apparatus, comprising; first and second cores mounted within enclosure means; each of said cores having primary and secondary windings; first and second breaker means associated respectively with said first and second core means; each said breaker means having forward and back contacts; circuit means including said forward contacts of said associated breaker means for connecting said secondary windings to a plurality of distribution conductors; back contacts of said first and second breaker means being connected in parallel circuits; each said parallel circuit being connected in series with a pair of said distribution conductors; said forward contacts of each said breaker means being open when said back contacts are closed; each said breaker means being energized from said associated secondary winding means.

7. An inductive apparatus, comprising; first and second cores mounted within enclosure means; each said core having primary and secondary windings; first and second breaker means associated respectively with said first and second core means; each said breaker means having forward and back contacts; circuit means including said forward contacts of said associated breaker means for connecting said secondary windings to a plurality of distribution conductors; back contacts of said first and second breaker means being connected in parallel circuits; each of said parallel circuits being connected in series with a pair of said distribution conductors; said forward contacts of each said breaker means being open when said back contacts are closed; each said breaker means being energized from said associated secondary winding means; each said breaker means being operative to close said forward contacts in response to the application of a predetermined voltage to said primary winding.

No references cited.